(12) United States Patent
Saje et al.

(10) Patent No.: US 12,168,478 B2
(45) Date of Patent: Dec. 17, 2024

(54) VEHICLE BODY STRUCTURE FORMED FROM A SYSTEM OF INTERCONNECTED UNITIZED BODY STRUCTURE COMPONENTS

(71) Applicant: GM Global Technology Operations LLC, Detroit, MI (US)

(72) Inventors: Robert N. Saje, Shelby Township, MI (US); Edward D. Moss, Commerce Township, MI (US); Warren J. Parsons, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 17/727,245

(22) Filed: Apr. 22, 2022

(65) Prior Publication Data
US 2023/0339549 A1 Oct. 26, 2023

(51) Int. Cl.
*B62D 25/20* (2006.01)

(52) U.S. Cl.
CPC ......... *B62D 25/20* (2013.01); *B62D 25/2018* (2013.01); *B62D 25/2036* (2013.01)

(58) Field of Classification Search
CPC ............... B62D 25/20; B62D 25/2036; B62D 25/2018; B62D 25/2027; B62D 25/08; B62D 25/085; B62D 25/2009
USPC .............. 296/184.1, 187.01, 193.03–193.04, 296/0.07–0.09, 198.24; 293/102, 293/120–122
See application file for complete search history.

(56) References Cited

U.S. PATENT DOCUMENTS

| | | | |
|---|---|---|---|
| 6,905,745 B2* | 6/2005 | Sheldon | B62D 21/15 |
| | | | 428/35.8 |
| 8,833,832 B2* | 9/2014 | Whipps | B62D 27/023 |
| | | | 296/203.02 |
| 8,973,980 B2* | 3/2015 | Mildner | B62D 29/041 |
| | | | 296/203.02 |
| 9,469,264 B2* | 10/2016 | Nagwanshi | B60R 19/38 |
| 10,000,238 B2* | 6/2018 | Buschjohann | B62D 21/08 |
| 10,766,543 B2* | 9/2020 | Cha | B62D 21/02 |
| 10,864,871 B2* | 12/2020 | Tashiro | B62D 21/152 |
| 11,912,339 B2* | 2/2024 | Monteith | B62D 29/04 |
| 2005/0179242 A1* | 8/2005 | Chernoff | B60N 2/01508 |
| | | | 280/781 |
| 2020/0406984 A1* | 12/2020 | Hasenauer | B62D 27/023 |

FOREIGN PATENT DOCUMENTS

| | | | | |
|---|---|---|---|---|
| DE | 102014116840 A1 * | 12/2015 | | B60R 19/02 |
| DE | 102018208155 A1 * | 11/2019 | | B62D 25/082 |

OTHER PUBLICATIONS

Text DE102014116840 (Year: 2015).*
Text DE102018208155 (Year: 2019).*

* cited by examiner

*Primary Examiner* — Dennis H Pedder
(74) *Attorney, Agent, or Firm* — CANTOR COLBURN LLP (57) ABSTRACT

A vehicle body structure includes a system of connected unitized body structure components, with at least one of the system of connected unitized body structure components including a hollow portion.

20 Claims, 10 Drawing Sheets

VEHICLE BODY STRUCTURE FORMED FROM A SYSTEM OF INTERCONNECTED UNITIZED BODY STRUCTURE COMPONENTS

INTRODUCTION

The subject disclosure relates to art of vehicle manufacturing and, more particularly, to a vehicle underbody formed from a system of interconnected unitized underbody components.

Many vehicle parts are created through stamping, vacuum forming, molding and the like. Creating a stamping die or mold to form parts is a time consuming and very costly process. A stamping die can cost upwards of one million dollars or more. Typically, a stamping die is formed by subtraction. For example, a block of metal is milled, machined, and drilled to form a desired shape. Once the desired shape in formed, a polishing process is initiated. The subtraction process is time consuming and very wasteful.

Other part forming devices, injection molds, vacuum forming molds and the like are equally costly, time consuming to produce and their formation results in a significant amount of wasted material. The need to reduce part costs in manufacturing automobiles is a long standing problem. In particular, there is a need to reduce part costs for ultra-low volume/niche automobiles. Niche vehicle programs typically require a high capital expenditure associated with producing an ultra-low volume of components. In order to maintain vehicle cost at an obtainable level an ultra-low volume, ultra-low capital approach is desired. Such an approach will ensure vehicle availability while, at the same time, securing a desired return on investment needed to keep such programs alive. Accordingly, the industry would welcome a low cost, readily manufacturable, ultra-low volume, ultra-low capital cost underbody system for vehicles.

SUMMARY

Disclosed, in accordance with a non-limiting example, is a vehicle body structure including a system of connected unitized body structure components, with at least one of the system of connected unitized body structure components including a hollow portion.

In addition to one or more of the features described above or below, or as an alternative, further embodiments could include wherein the hollow portion includes an internal rail.

In addition to one or more of the features described above or below, or as an alternative, further embodiments could include wherein the hollow portion includes a raised rib extending along the at least one of the system of unitized components in a first direction.

In addition to one or more of the features described above or below, or as an alternative, further embodiments could include wherein the hollow portion includes another raised rib extending along the at least one of the system of unitized body structure components in a second direction.

In addition to one or more of the features described above or below, or as an alternative, further embodiments could include wherein the another raised rib bisects the raised rib.

In addition to one or more of the features described above or below, or as an alternative, further embodiments could include wherein the hollow portion includes a u-shaped cross-section having a base wall, a first side wall, and a second side wall the raised rib being formed with and projecting outwardly of the base wall in the hollow portion.

In addition to one or more of the features described above or below, or as an alternative, further embodiments could include wherein the another raised rib includes a first portion formed on, and extending from the first side wall, a second portion formed on and extending from the second side wall, and a third portion formed on and extending from the base wall, the third portion being formed with the raised rib.

In addition to one or more of the features described above or below, or as an alternative, further embodiments could include wherein the hollow portion includes an internal rail that is spaced from the base wall.

In addition to one or more of the features described above or below, or as an alternative, further embodiments could include wherein the at least one of the system of connected unitized underbody components includes a first rail member, a second rail member, and a third rail member integrally formed with each other, the first, the second, and the third rail members being connected at an intersection.

In addition to one or more of the features described above or below, or as an alternative, further embodiments could include wherein the hollow portion is disposed at the intersection.

In addition to one or more of the features described above or below, or as an alternative, further embodiments could include wherein the at least one of the system of unitized body structure components includes a surface, including a raised boss, the hollow portion being disposed in the raised boss.

In addition to one or more of the features described above or below, or as an alternative, further embodiments could include wherein the surface includes a first portion having a first thickness and a second portion having a second thickness that is distinct from the first thickness.

In addition to one or more of the features described above or below, or as an alternative, further embodiments could include wherein the second thickness is greater than the first thickness and defines a structural reinforcing member.

In addition to one or more of the features described above or below, or as an alternative, further embodiments could include wherein the surface includes a first surface of a first unitized component mechanically connected to a second surface of a second unitized component.

In addition to one or more of the features described above or below, or as an alternative, further embodiments could include wherein the at least one of the system of connected unitized body structure components includes at least one of: a front quadrant system; a center system; and a rear quadrant system.

In addition to one or more of the features described above or below, or as an alternative, further embodiments could include wherein the front quadrant system includes a left front unitized underbody component and a right front unitized underbody component.

In addition to one or more of the features described above or below, or as an alternative, further embodiments could include wherein the rear quadrant system includes a left rear unitized underbody component and a right rear unitized underbody component.

In addition to one or more of the features described above or below, or as an alternative, further embodiments could include wherein the left rear unitized underbody component includes a first bridge member, and the right rear unitized underbody component includes a second bridge member.

In addition to one or more of the features described above or below, or as an alternative, further embodiments could include wherein the center system includes a unitized floor system mechanically connected to the front quadrant system and the rear quadrant system.

In addition to one or more of the features described above or below, or as an alternative, further embodiments could include wherein the unitized floor system includes a first unitized floor member mechanically connected to a second unitized floor member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
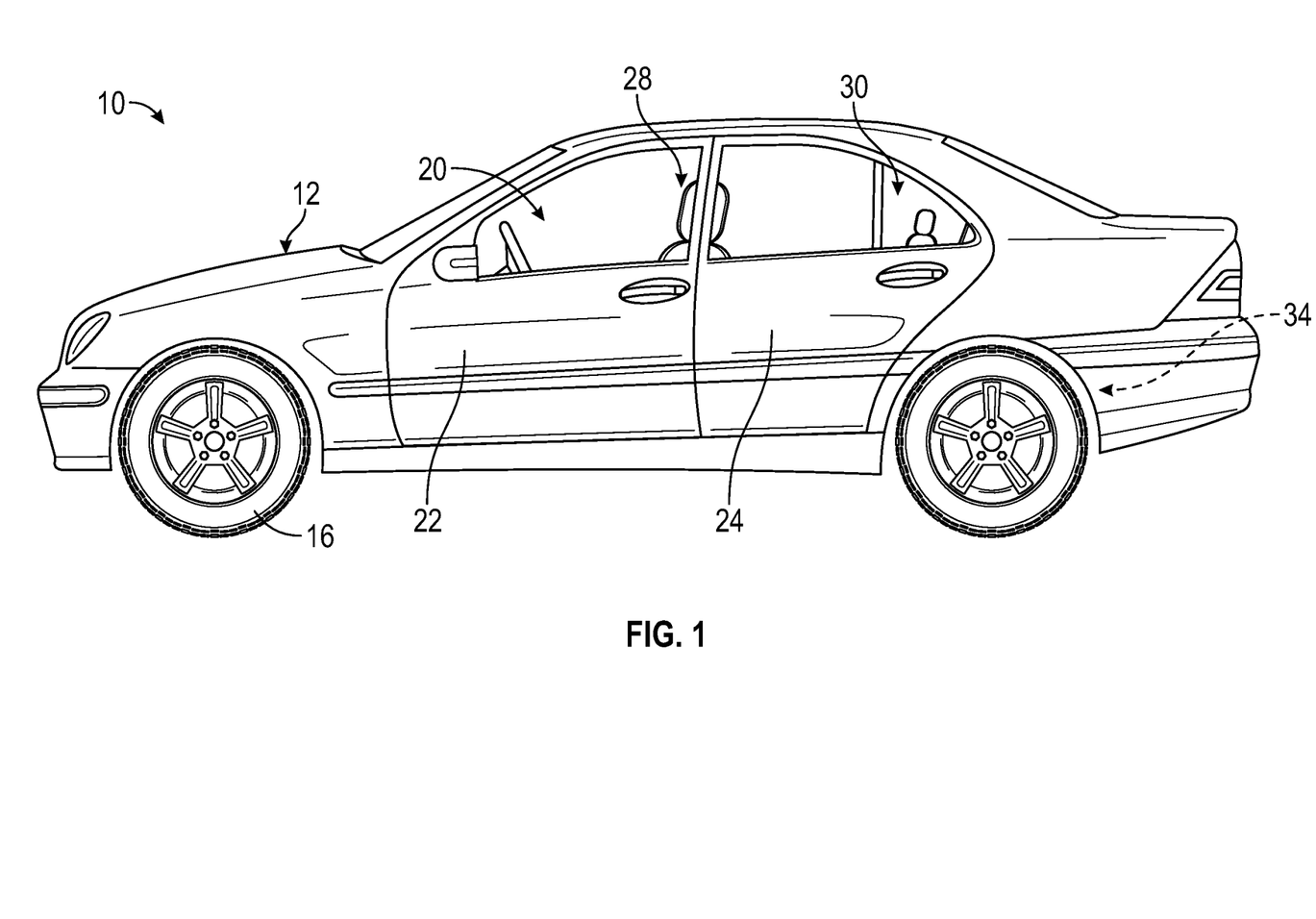
FIG. 1 depicts a vehicle including an underbody formed from a system of interconnected unitized components, in accordance with a non-limiting example.

A vehicle, in accordance with a non-limiting example, is indicated generally at 10 in FIG. 1. Vehicle 10 includes a body 12 supported on a plurality of wheels, one of which is indicated at 16. Body 12 includes a passenger compartment 20 that may be accessed by a front door 22 and or a rear door 24. Additional doors (not shown) may be arranged on an opposing side of vehicle 10. Passenger compartment 20 includes a front seat 28 and a rear seat 30. Vehicle 10 includes an underbody 34 (FIG. 2) formed from a system of unitized underbody components 38.

The term "unitized" describes that each of the underbody components in accordance with a non-limiting example is formed as a single, continuous member without seams, joints, or the like. That is, a unitized component does not undergo any joining processes that might have an impact on material selection. A unitized component has one or more continuous uninterrupted load paths. In a non-limiting example, each of the system of unitized underbody components 38 is formed through a sand casting process. That is, a liquid material, such as metal, metal composite, non-metal, or the like is poured into a mold formed from sand or the like. In another non-limiting example, liquid material, such as metal, metal composites, non-metal, or the like are injected into a mold formed from sand. When hardened, a unitized component is removed from the mold as a single piece. While other processes may be employed, "unitized" clearly describes a component formed as a single piece. The term "unitized system" should be understood to describe a grouping of unitized components.

Figure 2:
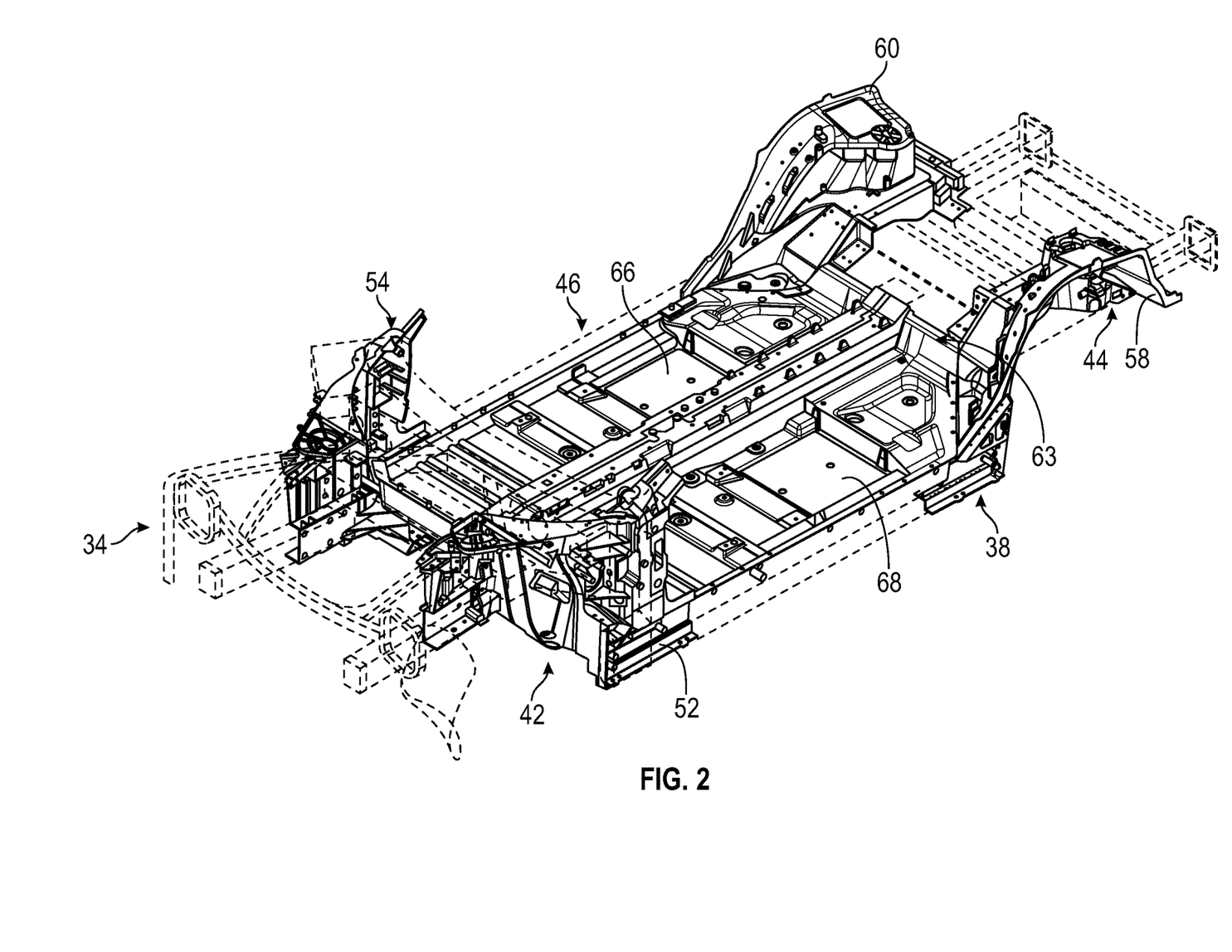
FIG. 2 is a perspective view of the underbody formed from the system of interconnected unitized components, in accordance with a non-limiting example.
Figure 3:
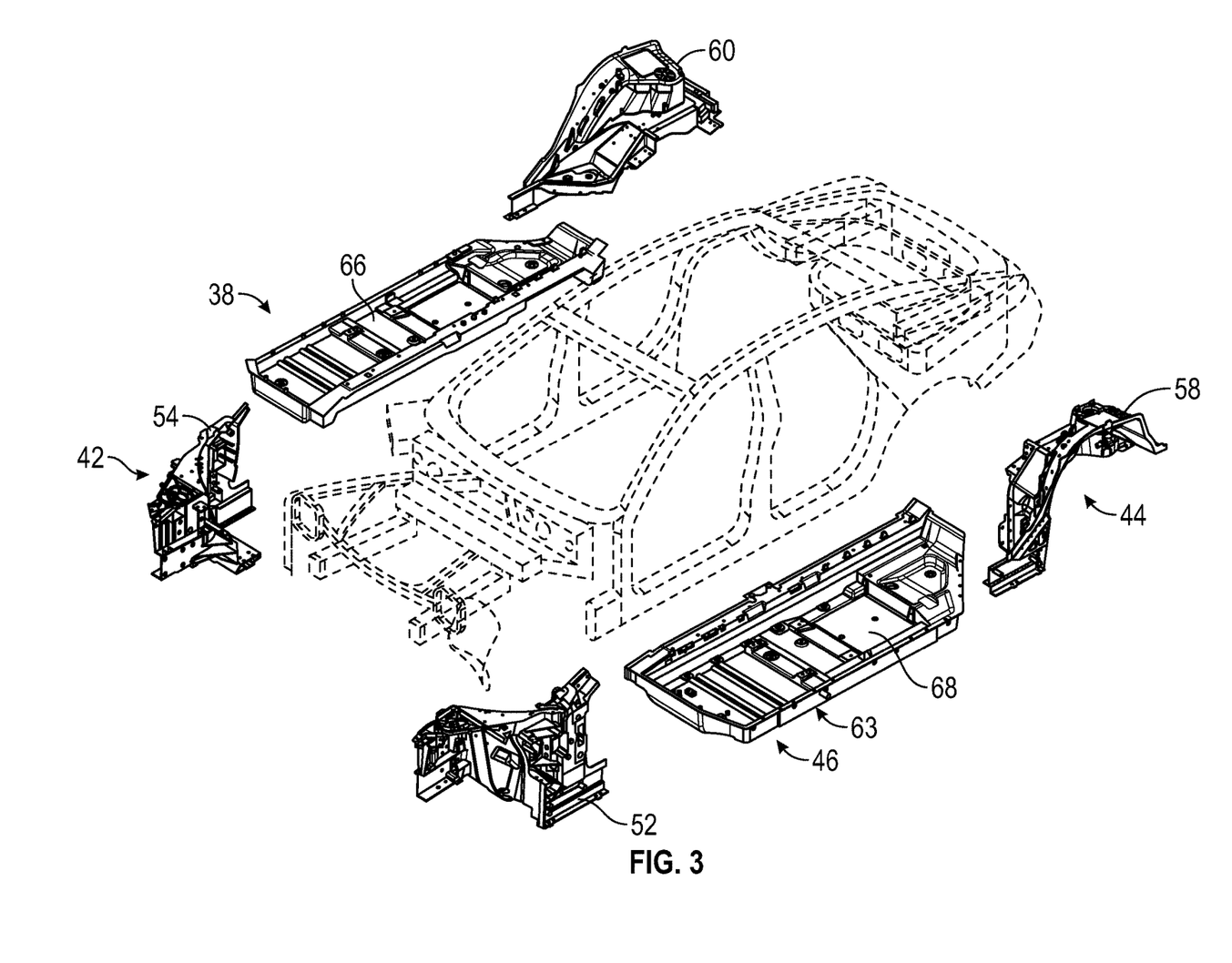
FIG. 3 is a disassembled view of an underbody including a front quadrant system having a left front unitized underbody component and a right front unitized underbody component, a unitized floor system, and a rear quadrant system having a left rear unitized underbody component and a right rear unitized underbody component that collectively form the system of interconnected unitized components, in accordance with a non-limiting example.

Referring to FIGS. 2 and 3 and with continued reference to FIG. 1, a system of unitized underbody components 38 includes a front quadrant system 42, a rear quadrant system 44, and a center system 46. In a non-limiting example, center system 46 extends between and connects with front quadrant system 42 and rear quadrant system 44. In a non-limiting example, front quadrant system 42 includes a left front unitized underbody component 52 and a right front unitized underbody component 54. Rear quadrant system 44 includes a left rear unitized underbody component 58 and a right rear unitized underbody component 60.

In a non-limiting example, center system 46 takes the form of a unitized floor system 63 including a first unitized floor member 66 joined to a second unitized floor member 68. At this point, it should be understood that the unitized components form part of the vehicle underbody, unitized components may be employed in other areas, both structural and non-structural in vehicle 10. Further, additional underbody components not discussed herein may be unitized components.

Figure 4:
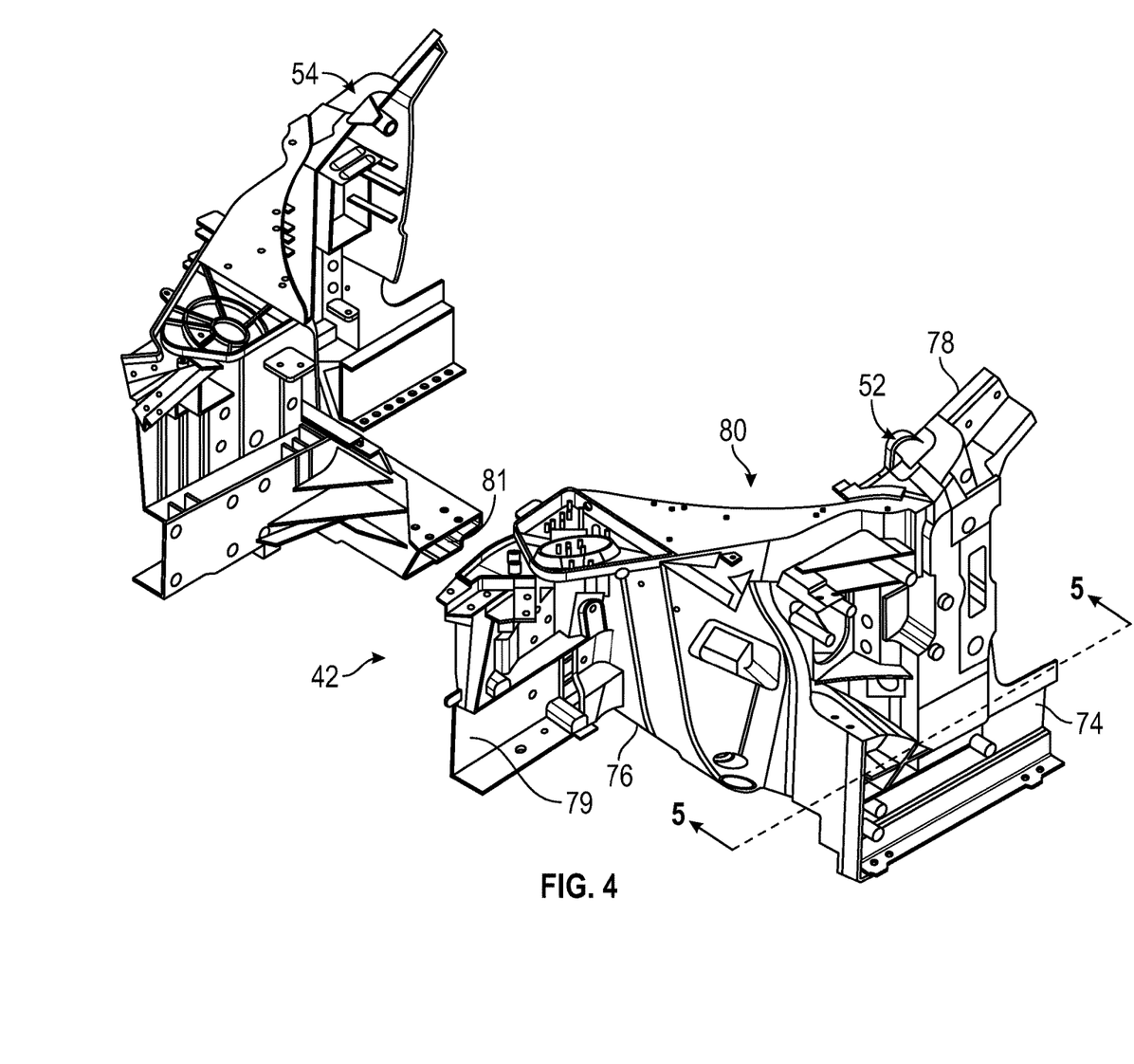
FIG. 4 is a perspective view of the front quadrant system including the left and right front unitized underbody components, in accordance with a non-limiting example.
Figure 5:
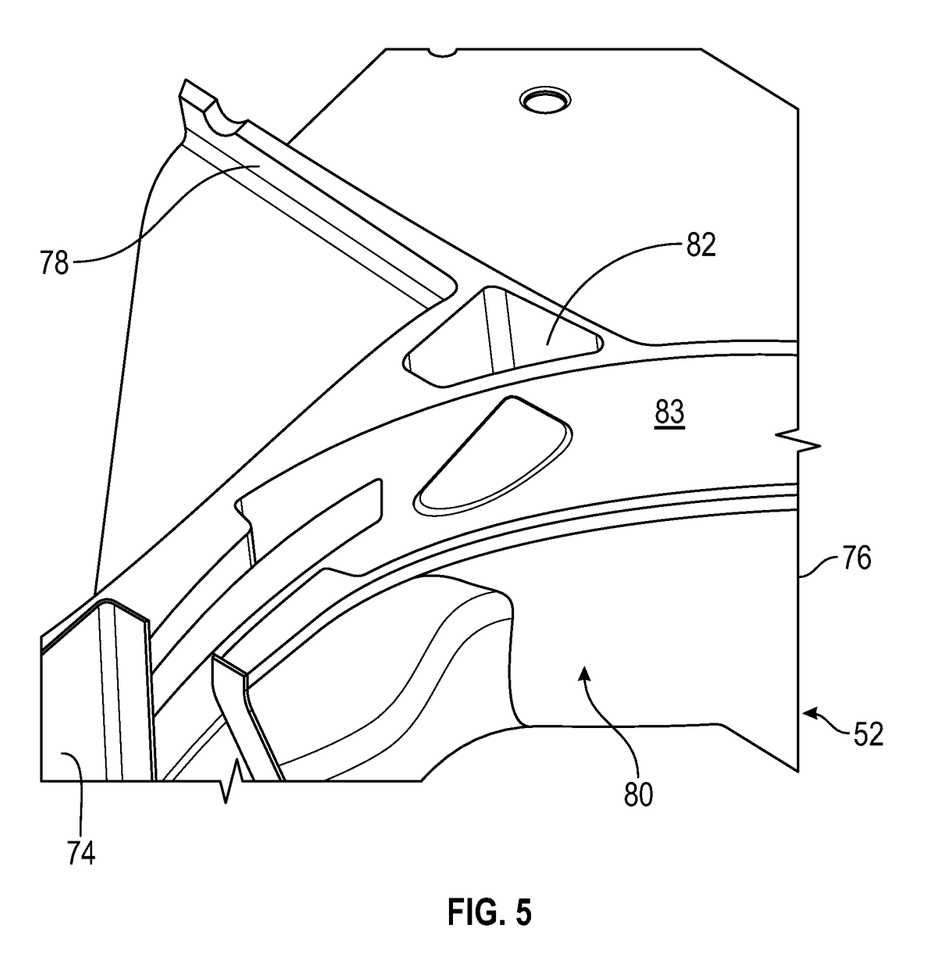
FIG. 5 is a cross-sectional view of the left unitized underbody component of the front quadrant of FIG. 4 taken through the line 5-5, in accordance with a non-limiting example.

Reference will now follow to FIGS. 4 and 5 and with continued reference to FIGS. 2 and 3 in describing left front unitized underbody component 52 of front quadrant system 42 with an understanding that right front unitized underbody component 54 includes similar structure. Left front unitized underbody component 52 defines a left front corner of underbody 34. In a non-limiting example, left front unitized underbody component 52 includes a first rail member 74, a second rail member 76, a third rail member 78, and a fourth rail member 79 that are joined at an intersection 80. Second rail member 76 defines a socket (not separately labeled) having a hollow interior such as shown at 81 in connection with right front unitized underbody component 54 in FIG. 4. In a non-limiting example, left front unitized underbody component 52 includes a hollow portion 82 defined, in part, by a bridge rail 83 at intersection 80 as shown in FIG. 5. Hollow portion 82 provides for a weight reduction of left front unitized underbody component 52 without sacrificing structure integrity provided by first, second, and third rails 74, 76, and 78 respectively.

Figure 6:
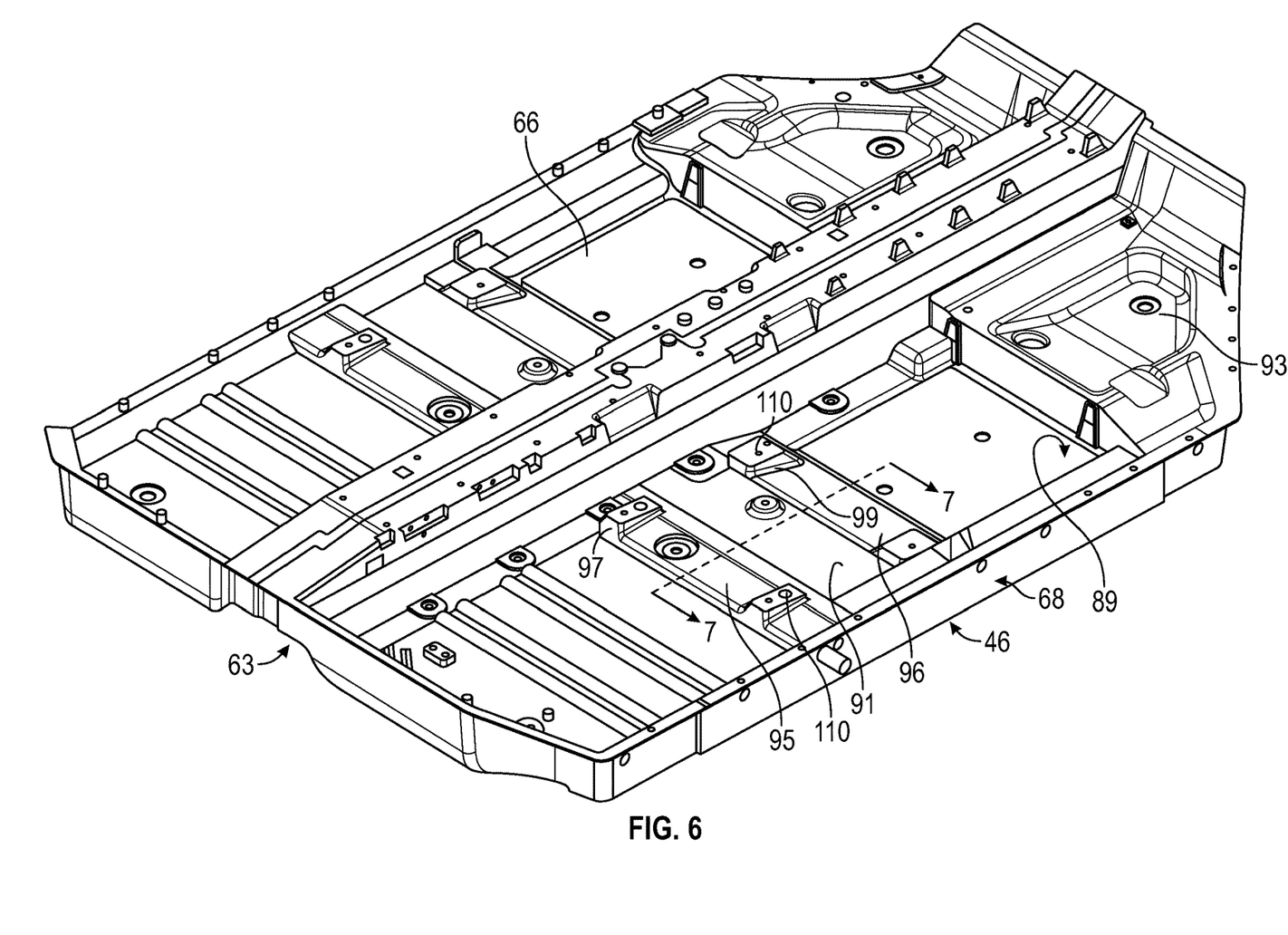
FIG. 6 depicts the unitized floor system of the underbody formed from the system of interconnected unitized components, in accordance with a non-limiting example.
Figure 7:
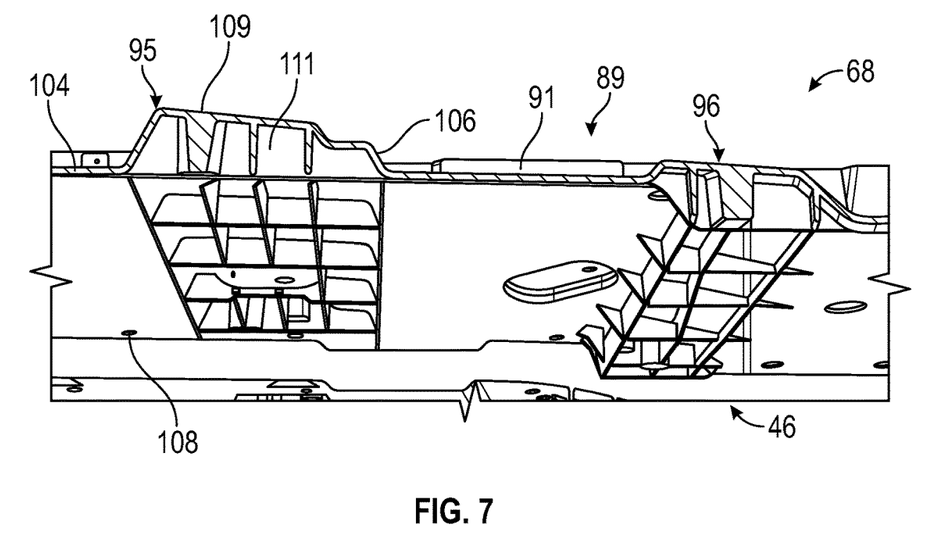
FIG. 7 is a cross-sectional view of a portion of the unitized floor system of FIG. 6 taken through the line 7-7 illustrating hollow cores, in accordance with a non-limiting example.
Figure 8:
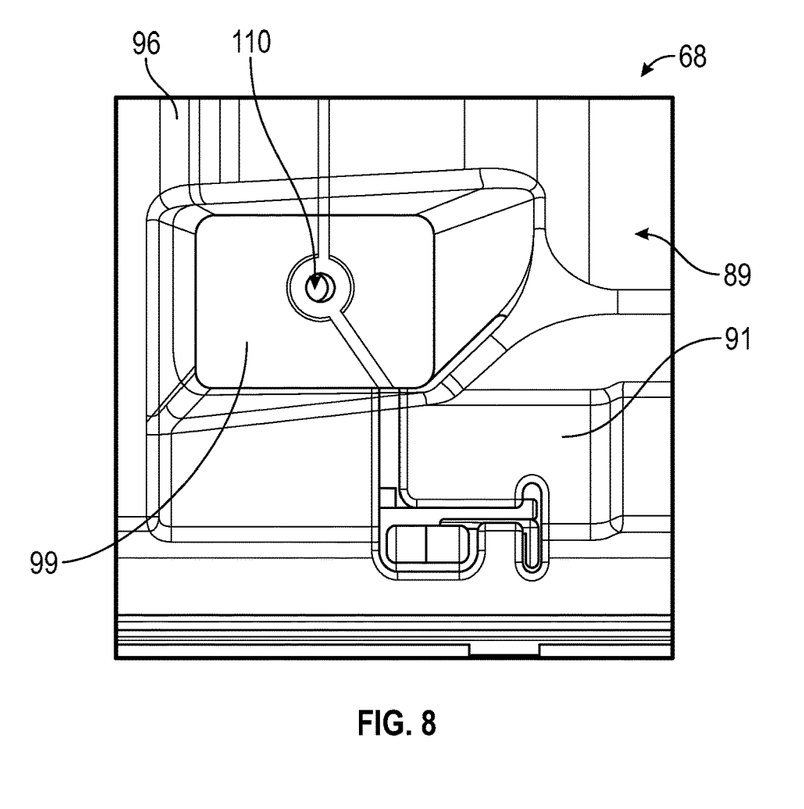
FIG. 8 depicts a rib formed in the internal core of FIG. 7, in accordance with a non-limiting example.

Reference will now follow to FIGS. 6-8 in describing second unitized floor member 68 in accordance with a non-limiting example, with an understanding that first unitized floor member 66 includes similar structure. In a non-limiting example, second unitized floor member 68 includes a floor surface 89 having a first section 91 and a second section 93 that is off-set relative to first section 91. In a non-limiting example, first section 91 includes a first plurality of hollow cores 95 and a second plurality of hollow cores 96. First plurality of hollow cores 95 provide structural support to first section 91 and includes a first plurality of raised bosses 97. Second plurality of hollow cores 96 provide additional structural support to first section 91 and includes a plurality of raised bosses 99. At this point, it should be understood that while described as having hollow cores, first and second unitized floor members 66 and 68 can also include raised ribs.

In a non-limiting example depicted in FIG. 7, first section 91 defines a first thickness 104 of second unitized floor member 68 and each of the first plurality of hollow cores 95 and second plurality of hollow cores 96 defines a second thickness such as shown at 106 that is greater than the first thickness. In a non-limiting example, the first plurality of hollow cores 95 include openings (not separately labeled) that receive bolts (also not separately labeled) that serve as an interface between floor surface 89 and another surface 108 of a support member 109 as shown in FIG. 7. First plurality of hollow cores 95 includes internal cells 111 that provide additional support that enables second unitized floor member 68 to support and manage greater loads.

In a non-limiting example, second plurality of raised bosses 99 serve as an interface to, for example, seat rails (not shown). As such, each of the second plurality of raised bosses 99 include an opening 110 as shown in FIG. 8 that may be used to receive a mechanical fastener, such as a nut (also not shown). By forming the first and second pluralities of hollow cores 95 and 96 and the corresponding first and second pluralities of raised bosses 97 and 99 with second unitized floor member 68, structural integrity is enhanced and the need to provide additional interface devices is avoided.

Figure 9:
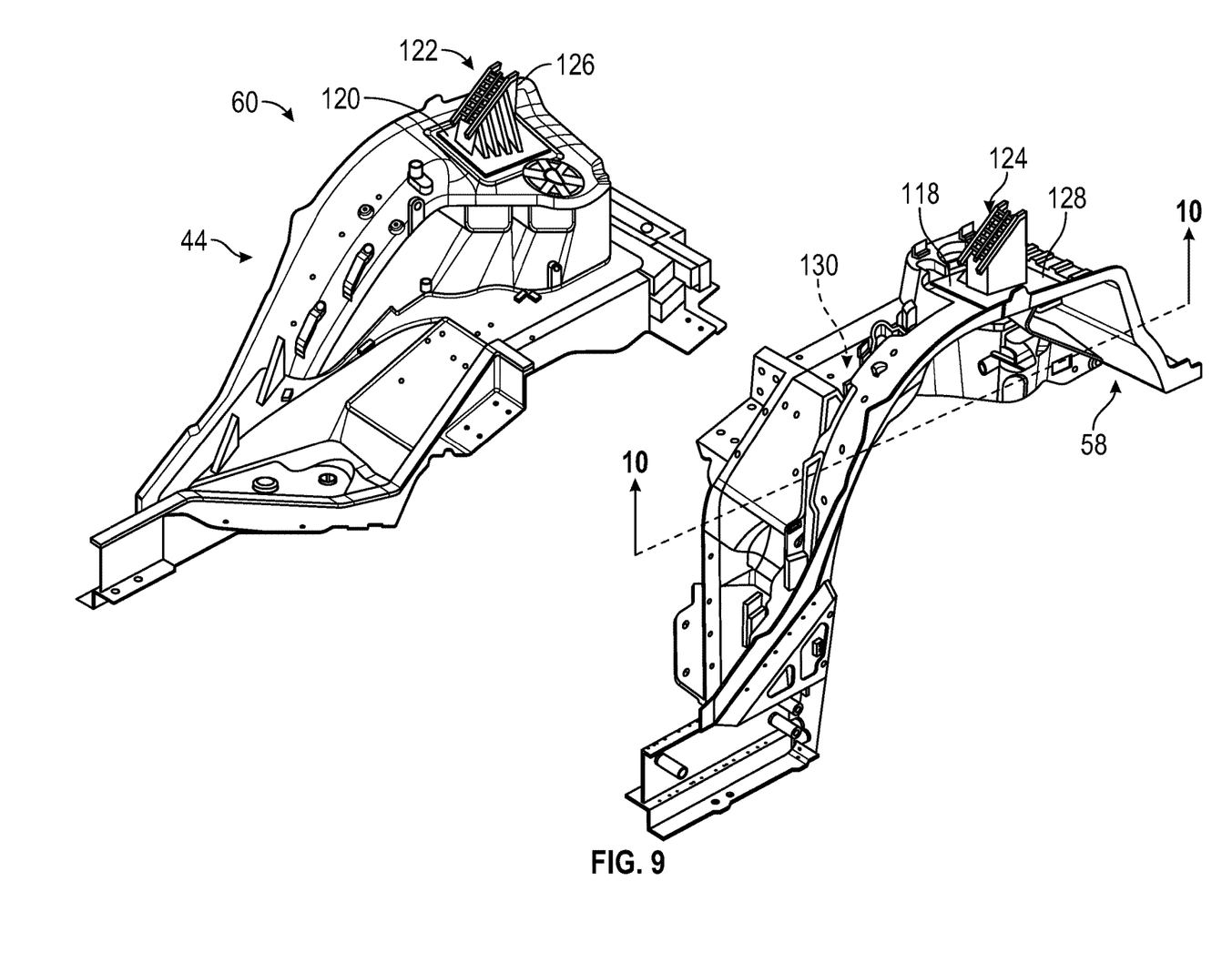
FIG. 9 is a perspective view of the rear quadrant system including the left and right unitized rear underbody components, in accordance with a non-limiting example.

Reference will now follow to FIG. 9 in describing rear quadrant system 44 in accordance with a non-limiting example. Left rear unitized underbody component 58 may include a first mounting surface 118 and right rear unitized underbody component 60 may include a second mounting surface 120. Each mounting surface 118, 120 supports bridge members 122 and 124 respectively that connect between rear quadrant system 44 and structure disposed above rear quadrant system 44 such as portions of body 12. In a non-limiting example, bridge members 122 and 124 are initially loosely connected to mounting surfaces 118 and 120 and not only provide an interface with, for example, body 12 but also establish slip planes in order to establish a desired part-to-part alignment. Further, in a non-limiting example, left rear unitized underbody component 58 and right rear unitized underbody component 60 include internal structural support members as will be detailed herein.

Figure 10:
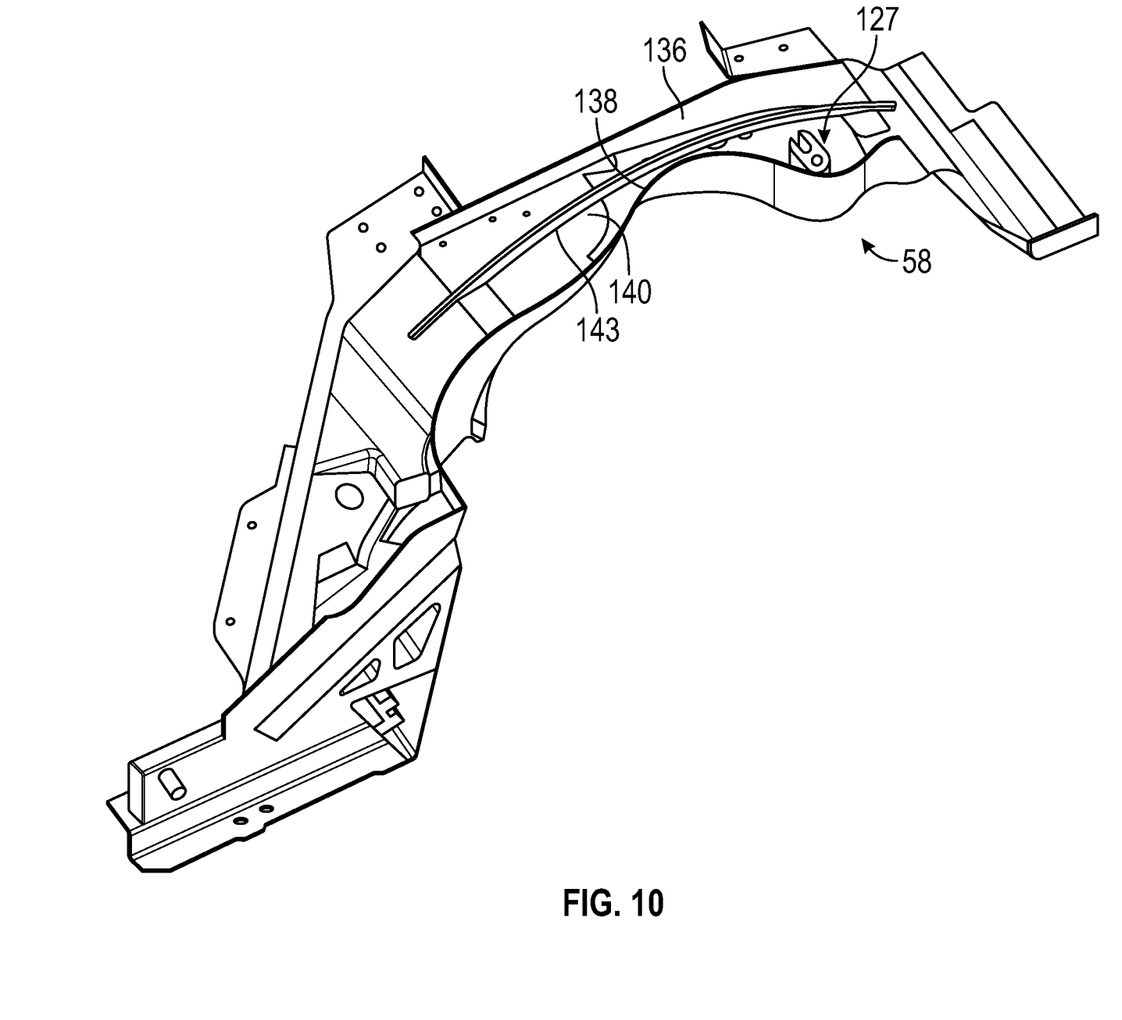
FIG. 10 depicts a cut-away view of a portion of the left unitized rear underbody component of FIG. 9 taken through the line 10-10, in accordance with a non-limiting example.
Figure 11:
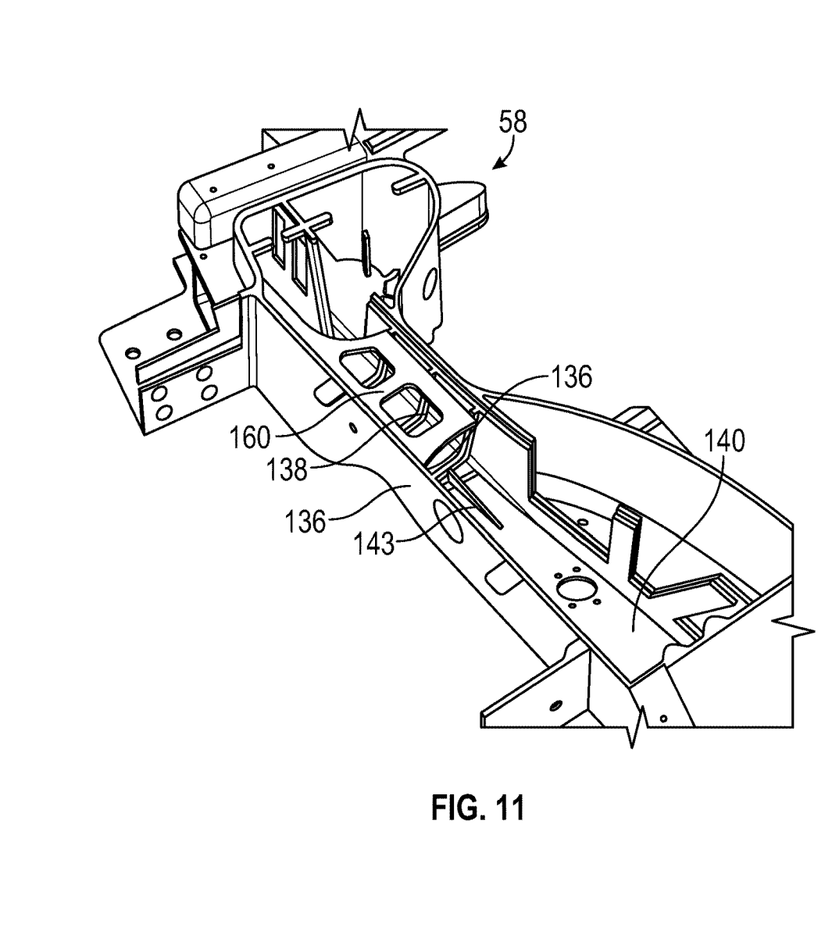
FIG. 11 is a detail view of the portion of the left unitized rear underbody component of FIG. 10 having an internal core, in accordance with a non-limiting example.
Figure 12:
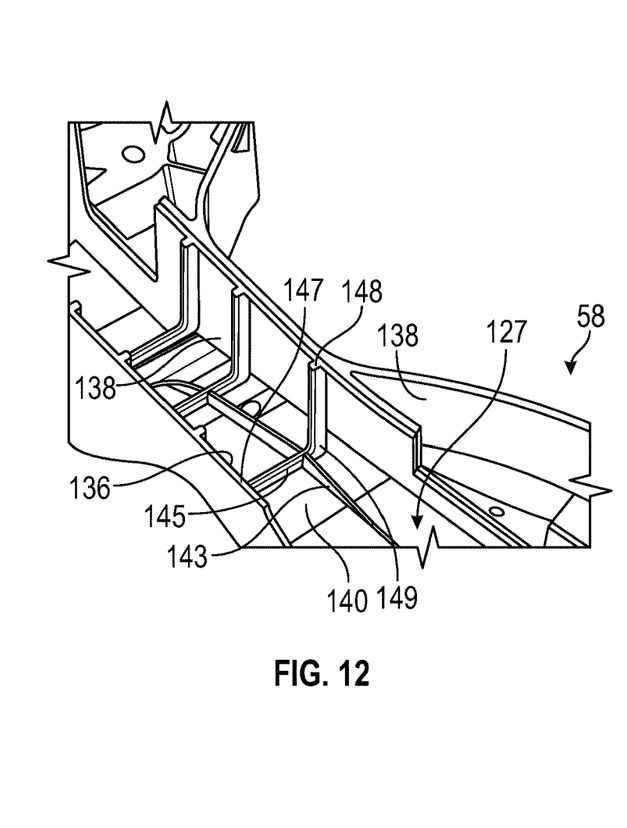
FIG. 12 is a detail view of the portion of the internal core of the left unitized rear underbody component of FIG. 11, in accordance with a non-limiting example.

Reference will follow to FIGS. 10-12 and with continued reference to FIG. 9 in describing left rear unitized underbody component 58 with an understanding that right rear unitized underbody component 60 includes similar structure. In a non-limiting example, left rear unitized underbody component 58 includes a hollow portion 127 having a generally U-shaped cross-section including a first side wall 136, a second side wall 138, and a base wall 140. Base wall 140 extends between and is formed with first side wall 136 and second side wall 138. In a non-limiting example, a vertical wall 143 is formed with and projects outwardly of base wall 140 between first side wall 136 and second side wall 138. Vertical wall 143 provides structural support to left rear unitized underbody component 58 at, for example first mounting surface 118.

In a non-limiting example, additional hollow cores, one of which is indicated at 145 are formed in hollow portion 127. Additional hollow cores 145 bisect vertical wall 143 and include a first portion 147, a second portion 148, and a third portion 149. First portion 147 projects outwardly from first side wall 136, second portion 148 projects outwardly from second side wall 138, and third portion 149 projects outwardly of base wall 140. Third portion 149 bisects vertical wall 143. In a non-limiting example, hollow portion 127 may also include an internal rail 160 (FIG. 11) that is formed with first side wall 136 and second side wall 138 and is spaced from base wall 140. Internal rail 160 defines a rail within a rail that provides additional support that is not possible through stamping and other part forming techniques. That is, sand casting allows for the creation of internal hollows that reduce weight while also providing additional structural support. Sand cores may be strategically placed within a component and then removed to form the internal hollows.

At this point, it should be understood that the non-limiting examples described herein represent underbody components that may be formed without the need for expensive stamping dies other metal forming components. Unitized components formed by, for example, a sand casting process, are a cost effective option for low volume vehicle offerings. Further, the process for forming the unitized components allows for the formation of internal hollow spaces that reduce weight as well as internal structural supports that are not possible with metal stamping techniques. Still further, while described in terms of underbody components, unitized components such as described herein may be used in other areas of the body structure of the vehicle.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle body structure comprising:
a system of connected unitized body structure components, wherein at least one of the system of connected unitized body structure components includes a hollow portion;
wherein the at least one of the system of unitized body structure components includes a surface, including a raised boss, the hollow portion being disposed in the raised boss;
wherein the surface includes a first portion having a first thickness and a second portion having a second thickness that is distinct from the first thickness.

2. The vehicle body structure according to claim 1, wherein the hollow portion includes an internal rail.

3. The vehicle body structure according to claim 1, wherein the hollow portion includes a raised rib extending along the at least one of the system of unitized body structure components in a first direction.

4. The vehicle body structure according to claim 3, wherein the hollow portion includes another raised rib extending along the at least one of the system of unitized body structure components in a second direction.

5. The vehicle body structure according to claim 4, wherein the another raised rib bisects the raised rib.

6. The vehicle body structure according to claim 4, wherein the hollow portion includes a u-shaped cross-section having a base wall, a first side wall, and a second side wall the raised rib being formed with and projecting outwardly of the base wall in the hollow portion.

7. The vehicle body structure according to claim 6, wherein the another raised rib includes a first portion formed on, and extending from the first side wall, a second portion formed on and extending from the second side wall, and a third portion formed on and extending from the base wall, the third portion being formed with the raised rib.

8. The vehicle body structure according to claim 6, wherein the hollow portion includes an internal rail that is spaced from the base wall.

9. The vehicle body structure according to claim 1, wherein the at least one of the system of connected unitized body structure components includes a first rail member, a second rail member and a third rail member integrally formed with each other, the first, the second, and the third rail members being connected at an intersection.

10. The vehicle body structure according to claim 9, wherein the hollow portion is disposed at the intersection.

11. The vehicle body structure according to claim 1, wherein the second thickness is greater than the first thickness and defines a structural reinforcing member.

12. The vehicle body structure according to claim 1, wherein the at least one of the system of connected unitized body structure components includes at least one of:
a front quadrant system;
a center system; and
a rear quadrant system.

13. The vehicle body structure according to claim 12, wherein the front quadrant system includes a left front unitized underbody component and a right front unitized underbody component.

14. The vehicle body structure according to claim 12, wherein the rear quadrant system includes a left rear unitized underbody component and a right rear unitized underbody component.

15. The vehicle body structure according to claim 14, wherein the left rear unitized underbody component includes a first bridge member, and the right rear unitized underbody component includes a second bridge member.

16. The vehicle body structure according to claim 12, wherein the center system includes a unitized floor system mechanically connected to the front quadrant system and the rear quadrant system.

17. The vehicle body structure according to claim 16, wherein the unitized floor system includes a first unitized floor member mechanically connected to a second unitized floor member.

18. A vehicle, comprising:
a vehicle body defining a passenger compartment; and
a plurality of wheels supportive of the vehicle body;
wherein the vehicle body includes an underbody formed from a system of connected unitized body structure components, wherein at least one of the system of connected unitized body structure components includes a hollow portion;
wherein the at least one of the system of unitized body structure components includes a surface, including a raised boss, the hollow portion being disposed in the raised boss;
wherein the surface includes a first portion having a first thickness and a second portion having a second thickness that is distinct from the first thickness.

19. The vehicle according to claim 18, wherein the hollow portion includes an internal rail.

20. The vehicle according to claim 18, wherein the hollow portion includes a raised rib extending along the at least one of the system of unitized body structure components in a first direction.

* * * * *